United States Patent
Kang et al.

(10) Patent No.: US 7,554,956 B2
(45) Date of Patent: Jun. 30, 2009

(54) METHOD AND APPARATUS FOR MULTI-USER CODE CHANNEL ACTIVATION DETECTION IN WIRELESS COMMUNICATION SYSTEM

(75) Inventors: Shaoli Kang, Beijing (CN); Lubang Cheng, Beijing (CN); Yingmin Wang, Beijing (CN)

(73) Assignee: DA Tang Mobile Communications Equipment Co., Ltd., Beijing (CN)

(*) Notice: Subject to any disclaimer, the term of this patent is extended or adjusted under 35 U.S.C. 154(b) by 568 days.

(21) Appl. No.: 11/288,947

(22) Filed: Nov. 28, 2005

(65) Prior Publication Data

US 2006/0153142 A1 Jul. 13, 2006

Related U.S. Application Data

(63) Continuation of application No. PCT/CN2004/000561, filed on May 28, 2004.

(30) Foreign Application Priority Data

May 28, 2003 (CN) ................. 03 1 40550

(51) Int. Cl.
H04B 7/216 (2006.01)
(52) U.S. Cl. ............... 370/335; 370/252; 375/137
(58) Field of Classification Search ........... 370/320, 370/335, 342
See application file for complete search history.

(56) References Cited

U.S. PATENT DOCUMENTS

| | | | |
|---|---|---|---|
| 6,907,092 B1 | 6/2005 | Yakhnich et al. | 375/346 |
| 2002/0045443 A1 | 4/2002 | Hunzinger | |
| 2002/0110099 A1 | 8/2002 | Zeira et al. | 370/329 |
| 2002/0176389 A1 | 11/2002 | Colombo et al. | |
| 2004/0032917 A1 | 2/2004 | Hwang et al. | 375/343 |
| 2004/0174854 A1 | 9/2004 | Supplee et al. | 370/342 |

FOREIGN PATENT DOCUMENTS

| | | |
|---|---|---|
| JP | 2001-308824 | 11/2001 |
| JP | 2001308824 A | 11/2001 |
| WO | WO 02/33982 A2 | 4/2002 |

OTHER PUBLICATIONS

Minying Sun; Ser Wah Oh; "Detect Spreading Code for Multi-User Detector in TD-SCDMS Downlink", Sep. 25-28, 2005, Vehicular Technology Conference 2005, VTC-2005-Fall. 2005 IEEE 62nd, pp. 1984-1987.

*Primary Examiner*—Wing F Chan
*Assistant Examiner*—Otis L Thompson, Jr.
(74) *Attorney, Agent, or Firm*—Christie, Parker & Hale, LLP (57) ABSTRACT

The present invention provides a method for detecting active code channels of multiple users in a wireless communications system. The method comprises the steps of: receiving the radio signals that contain the signals of at least two of said multiple users; separating the data and training sequences of said received radio signals; making channel estimation based on said separated training sequences to obtain the estimated channel response; obtaining, based on said estimated channel response, the active channel response windows; obtaining the allocated spreading codes to which said active channel response windows may correspond; determining, based on the estimated channel responses and the possible corresponding allocated spreading codes, the active spreading code channels corresponding to said active channel response windows; making multi-user detection in the determined active code channels. Thus the blind or semi-blind detection of the receiver is implemented.

15 Claims, 4 Drawing Sheets

METHOD AND APPARATUS FOR MULTI-USER CODE CHANNEL ACTIVATION DETECTION IN WIRELESS COMMUNICATION SYSTEM

CROSS-REFERENCE TO RELATED APPLICATIONS

This application is a Continuation Application of International Application Number PCT/CN2004/000561, filed on May 28, 2004, which claims priority of Chinese Patent Application Number 03140550.9, filed on May 28, 2003.

FIELD OF THE TECHNOLOGY

The invention generally relates to the wireless communication technology, specifically to a method and apparatus for detection of active code channels before multi-user detection in a wireless communication system.

BACKGROUND OF THE INVENTION

In a CDMA mobile communication system, because of co-existing signals of multiple users in the same channel and complexity of the wireless environment, when a receiver receives an expected signal, it is unavoidable that the signal is affected by the fading, the Multiple Address Interference (MAI), and the Inter-symbol Interference (ISI). Utilizing interference information effectively, the multi-user detection algorithm eliminates or degrades the interference through de-spreading and multi-user joint channel equalization, so the system performance is improved greatly.

Before multi-user detection, the spreading codes and the corresponding channel responses of the users accessing in the current timeslot must be known by the receiver first. Usually, the channel responses can be obtained by channel estimation through training sequences. However, for the spreading codes, a terminal knows only about the spreading code used by itself and does not know about other users' spreading codes contained in received signals. Furthermore, on the one hand, when the traffic rate changes from large to small, there may be no transmission in some of the allocated channels; on the other hand, due to the complexity of the beam forming transmission and the wireless environment, some of the allocated channels may experience severe attenuation and fading. All these will result in the variation of the received signals of the mobile terminal.

At present, a higher layer signaling can be used to inform each mobile station of the necessary spreading codes for multi-user detection. However, its implementation is very difficult. The main reasons are: first, the real-time variation of received signals cannot be reflected; second, complexity of the signaling is too high; and third, load of the terminal is too heavy.

Therefore, in the wireless communication system, it is desirable that there is a method and apparatus for detecting the active code channels before multi-user detection so as to inform each mobile station ready to receive signals of the information of spreading codes needed in multi-user detection. Such information will not only reflect the real-time variation of received signals but also require lower signaling complexity and produce less heavy load for the terminals.

SUMMARY OF THE INVENTION

The objective of this invention is to provide a method that detects the active code channels of multiple users in a wireless communication system. This method can provide the terminal for the information of spreading codes of the transmitter before making multi-user detection so as to overcome the shortcomings of the prior art.

The invention is implemented by the following technology scheme.

A method for detecting active code channels of multiple users in a wireless communication system, comprising the following steps:

Receiving the radio signals of at least two user of said multiple users;

Separating the data and training sequences from said received radio signals;

Making joint channel estimation to obtain a joint channel response, based on said separated training sequences;

Obtaining active code-channel response window, based on said joint channel response;

Obtaining the allocated spreading codes that possibly correspond to said active code-channel response window;

Obtaining the active spreading code channels corresponding to said active code-channel response window, based on the channel responses of said active code-channel response window, possibly-corresponding allocated spreading codes and said separated data sequences.

The invention also provides an apparatus for detecting active multi-user code channels in a wireless communication system, comprising:

A signal separating module for use in separating the data sequences and training sequences from a received signal that contains the radio signals of at least two users;

A channel estimation module for use in making channel estimation according to the training sequences outputted from said signal separating module in order to obtain joint channel response;

An activation decision module of channel response window for use in obtaining active code channel response window according to the joint channel response outputted from said channel estimation module;

A spreading code module for use in obtaining the possibly-corresponding allocated spreading codes according to the active code channel response window outputted from said active decision module of channel response window;

An activation decision module of spreading code for use in obtaining and outputting the active spreading code channels according to the channel response of the active channel response window, said separated data sequences outputted from said signal separation module and said possibly-corresponding allocated spreading codes outputted from the spreading code module.

The invention can provide the necessary information of the spreading codes for multi-user detection, and present the said information to each mobile station that is ready to receive the signal. The said information reflects the real-time changes of access information and it is obtained without the need of very complex higher-layer signaling.

The method and apparatus provided by the invention overcomes the weaknesses of the prior art, and the method for detecting active code channels proposed in this invention makes it possible to implement blind (or semi-blind) detection at the terminal. The only necessary information that the base station provides for the mobile station ready to receive signals is the channel allocation information of the expected user, and the mobile station can use joint channel responses and all possible spreading codes to extract the active code channels from the received signal while discarding the code channels that the base station does not allocate, the code channels that the base station has allocated but does not transmit, and the code channels that the base station have transmitted but are severely attenuated by beam forming or severely faded after being transmitted through the channels. In this way, the method provides the multi-user detection a more reasonable input, guarantees the implementation of multi-user detection at the terminal, and improves the performance of the multi-user detection algorithms.

EMBODIMENTS OF THE INVENTION

The invention will be described hereinafter in more details with reference to the accompanying drawings and an embodiment.

The invention provides a method and apparatus to detect the active code channels. The method determines the channel response window and the active status of the corresponding code channel based on the joint channel responses and the matched filtering results, and then makes multi-user detection based on the active code channels obtained. The implementation of the method is simple, and the method can be used in any CDMA system that takes channel responses and spreading codes as the characteristic parameters. Besides, the method supports variable system data rates, and has the ability to combat beam forming attenuation and multi-path fading. The invention guarantees the feasibility and performance of multi-user detection at a mobile terminal.

Figure 1:
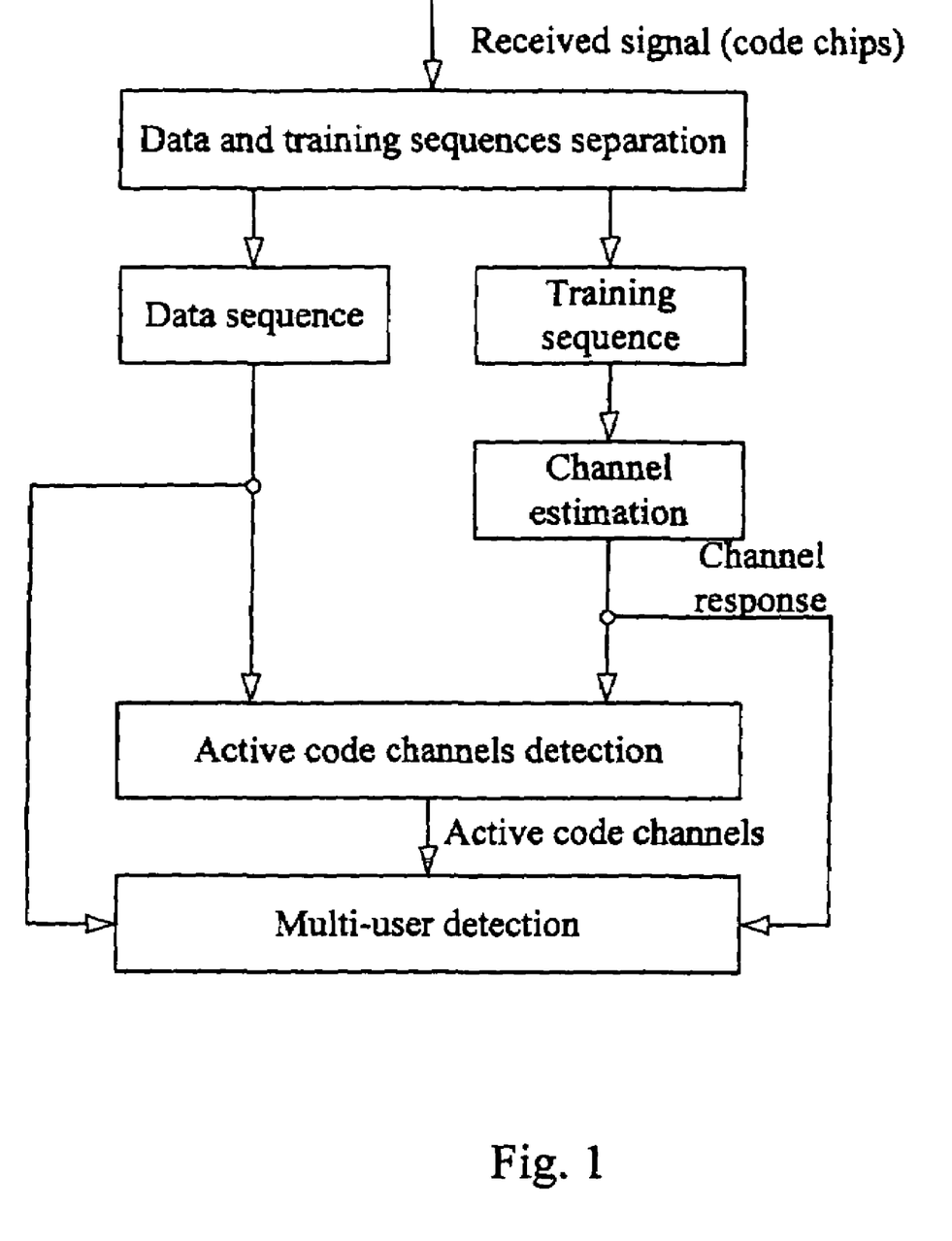
FIG. 1 shows a block diagram for the working principle of a terminal receiver of CDMA system containing the function of detecting active code channels in accordance with this invention.

FIG. 1 shows a block diagram for the working principle of a terminal receiver of CDMA system that contains the function of detecting active code channels. The received signal is first separated into data sequences and training sequences, and then the training sequences are used to make channel estimation in order to obtain the channel response. The method of active code channel detection then takes the data sequences and channel response as input, and outputs the active code channels that can provide effective input for the multi-user detection algorithm.

Figure 2:
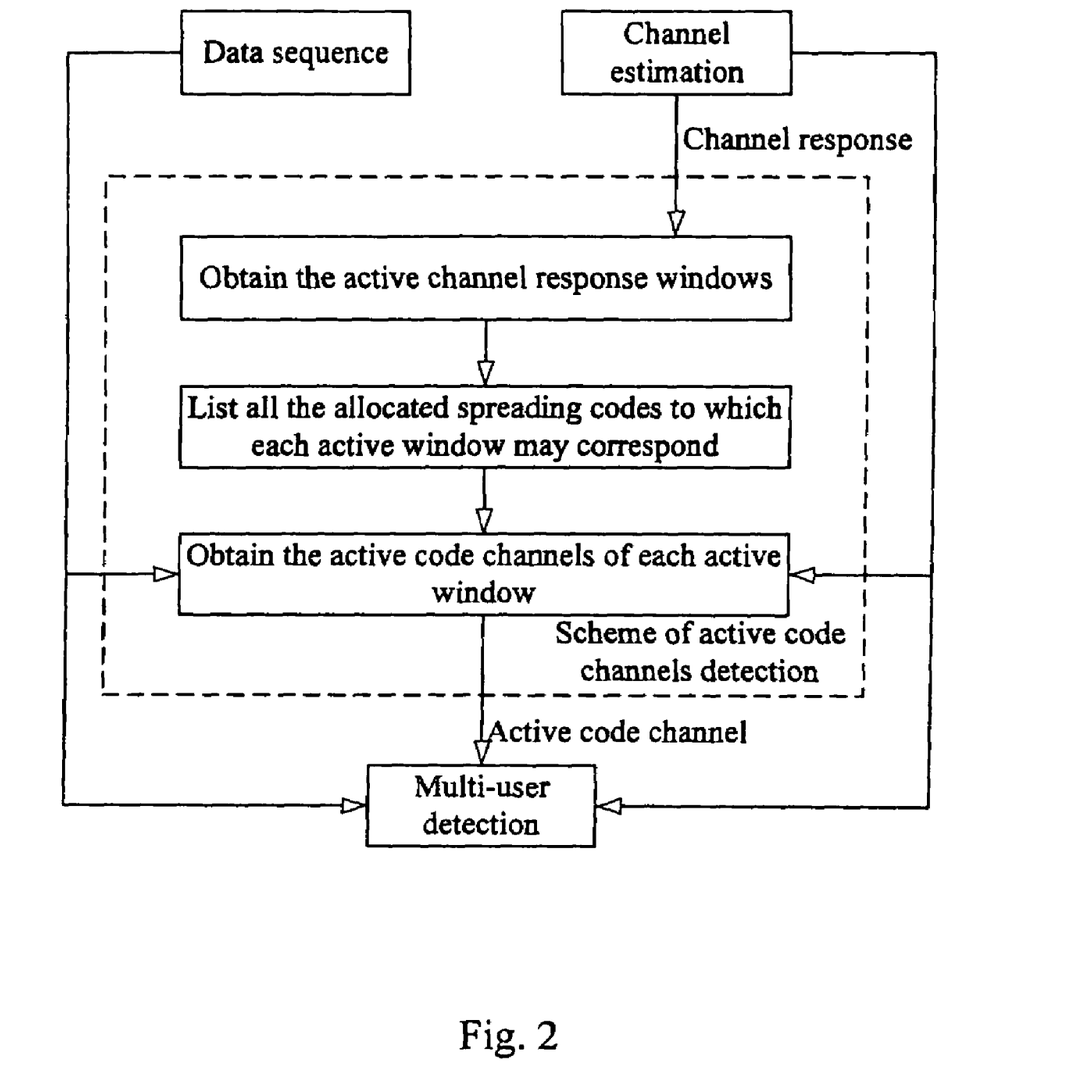
FIG. 2 shows a flowchart of the method for detecting active code channels in accordance with this invention.

The detection procedure of active code channels is shown in FIG. 2, and it has three steps:

Step 1: Find the active channel response window. Determine whether the channel response window of each user is active or not. If a channel response window is active, it means that the user that occupies this response window has data transmission from the base station and needs to take part in the multi-user detection; otherwise, it means that either the user that occupies the response window has not data transmission from the base station, or the transmission data has been severely attenuated by the beam forming or seriously faded by the channel and therefore the signal contribution of this user at this receiving terminal is so weak that the signal of this user does not need to take part in the multi-user detection.

Step 2. List all possible allocated spreading codes corresponding to each active channel response window. Since the allocated spreading code for the expected user is known, the key point of this step is to list all possible spreading codes allocated for all interfering users.

Step 3. Find out the active code channels that are corresponding to each active channel response window. For each active channel response window, the matched filtering is done with the channel response of the corresponding window and all possible spreading codes allocated, and then the power of the matched data is calculated, based on the calculated power, the active status of the spreading code channels are determined finally. If an allocated code channel is determined as active, it shows that data on the channel have been transmitted from the base station and have not been severely attenuated or faded and this channel needs to take part in the multi-user detection; otherwise, the code channel has not been allocated at the base station, or has been allocated but has not been transmitted, or has been transmitted but been severely attenuated by beam forming or seriously faded by wireless channels, i.e. this code channel is not active, and it does not need to take part in the multi-user detection.

The embodiment of the invention takes a TD-SCDMA (Time Division-Synchronous Code Division Multiple Access) system as an example, and the detailed implementation of the method for detecting active code channels at the terminals is described in the following in order to help personnel skilled in the art to understand and implement the invention.

For a TD-SCDMA system, the present standard specifies that the transmission of training sequences of downlink has three modes: specific midamble, default midamble and common midamble. The method for detecting active code channels in accordance with this invention can be applied to all these three modes to determine the active code channel before making multi-user detection. And the implementations for all these three modes are similar, so in the following description, the specific midamble mode is taken as an example to explain the implementing procedure fro detecting active code channels in detail.

Figure 3:
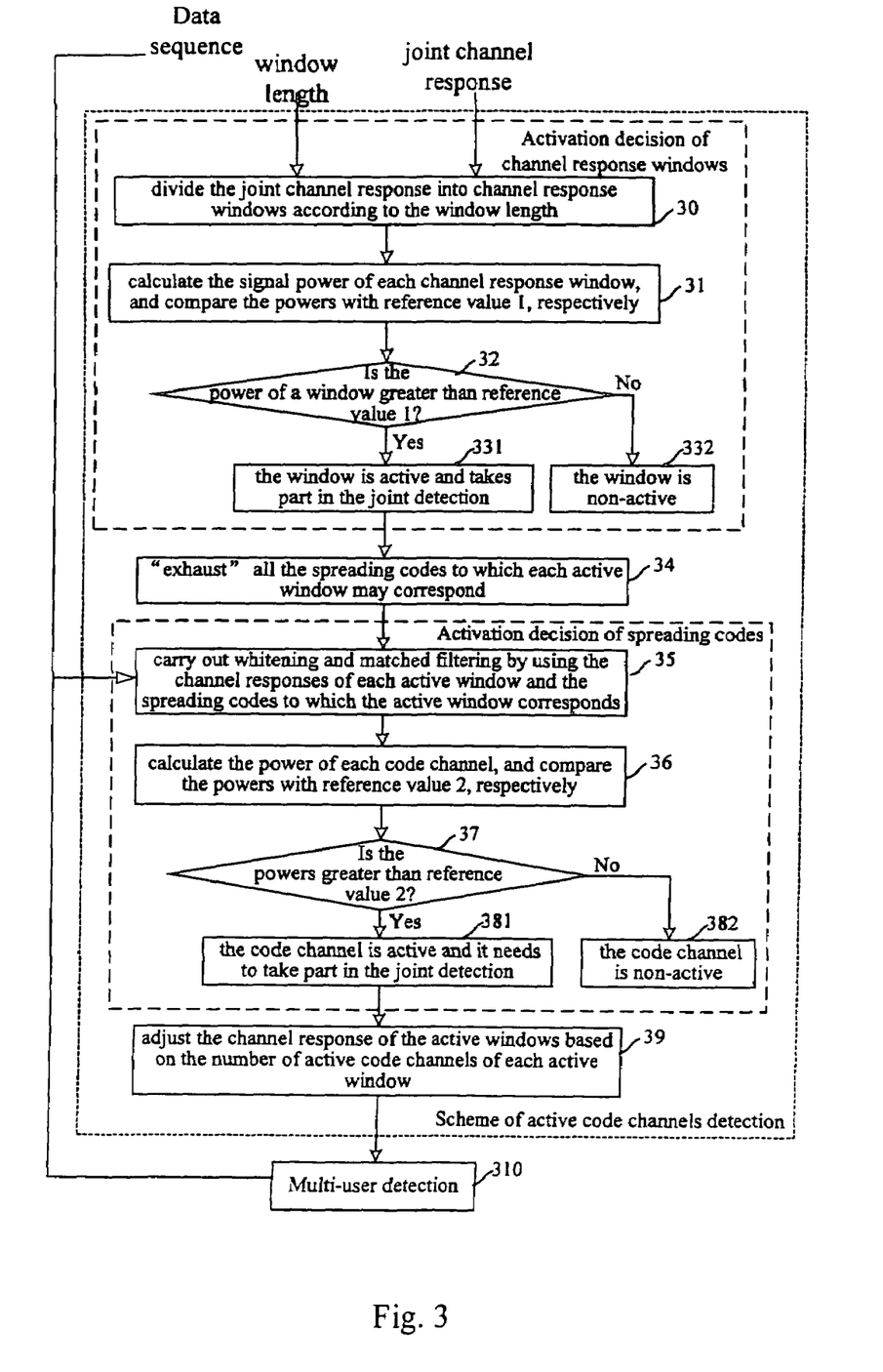
FIG. 3 shows a flowchart of joint detection at a terminal of TD-SCDMA system in the specific midamble mode in an embodiment of this invention.

FIG. 3 shows the flowchart of joint detection at a terminal of a TD-SCDMA system in the specific midamble mode in an embodiment according to this invention. Before making multi-user detection, the method for detecting active code channels is used to obtain the corresponding spreading code of each midamble shift. In the specific midamble allocation mode, a higher layer software of system defines the corresponding spreading codes of each midamble shift. For downlink, the terminal does not know about this information, and this invention determines the corresponding spreading codes of each midamble shift by means of detecting active code channels.

In Step 30, divide the joint channel responses according to the window length to obtain the corresponding channel response window of each midamble shift.

$$h = (h^{(1)} h^{(2)} \ldots h^{(k_m)} \ldots h^{(K_m)} h^{(K_m+1)}) \quad (1)$$

$$h^{(k_m)} = (h_1^{(k_m)} h_2^{(k_m)} \ldots h_w^{(k_m)} \ldots h_W^{(k_m)}), k_m = 1 \ldots K_m \quad (2)$$

In equation (1), the $\underline{h}$ represents the joint channel responses, the $h^{(k_m)}$, $k_m = 1 \ldots K_m$ represents the corresponding channel response window of the $k_m^{th}$ midamble shift, and the $K_m$ represents the total number of the midamble shifts. In equation (2), the W represents window length, and the relationship between W and $K_m$ is $$W = \left\lceil \frac{128}{K_m} \right\rceil.$$

When $K_m W=128$, $h^{(K_m+1)}$ is an empty matrix, i.e. equation (1) is simplified to: $h=(h^{(1)} h^{(2)} \ldots h^{(k_m)} \ldots h^{(K_m)})$.

In Steps 31, 32, 331 and 332, calculate signal power of each channel response window, and compare these power values with the first reference value; if the power is greater than the first reference value, the corresponding channel response window is active; if the power is no more than the first reference value, the channel response window is non-active.

$$P_1^{(k_m)} = \|h^{(k_m)}\|^2, \quad k_m = 1\ldots K_m \qquad (3)$$

$$f_1(k_m) = \begin{cases} 1, & P_1^{(k_m)} > T_1 \\ 0, & P_1^{(k_m)} \leq T_1 \end{cases} \quad k_m = 1\ldots K_m \qquad (4)$$

In equation (3), $P_1^{(k_m)}$ represents the power of the $k_m^{th}$ channel response window. In equation (4), $T_1$ represents the first reference value, $f_1(\bullet)$ represents the active status function; if $f_1(k_m)=1$, then the $k_m^{th}$ channel response window is active, i.e. an active window; if $f_1(k_m)=0$, then the $k_m^{th}$ channel response window is non-active, i.e. a non-active window.

In Step 34, list the corresponding spreading codes of each active window. The channel response window of the expected user is always active, and the spreading code of this active window is known. As for active windows other than that of the expected users, also referred to as active windows of interfering users, their corresponding spreading codes are obtained by the 'exhaustive' method. For the downlink, the spreading factor is 16, so the corresponding spreading codes corresponding to each active interference window are all the spreading code that has a spreading factor equaling 16 except the spreading code of the expected user. For example, suppose the expected user occupies the first spreading code, then the spreading codes from the second to the sixteenth corresponding to other active windows can be exhausted.

In Step 35, take the channel response of each active window and the corresponding spreading code as well as the data sequences for calculation of whitening and matched filtering.

$$\hat{d}_n^{(k_m,k)} = (c^{(k)} * h^{(k_m)})^* \cdot (e_{16(n-1)+1} \cdots e_{16n+W-1})^T, \\ n=1\ldots 22, \; f_1(k_m)=1 \qquad (5)$$

$$c^{(k)} = (c_1^{(k)} \, c_2^{(k)} \ldots c_{16}^{(k)}) \qquad (6)$$

In equation (5), $k_m$ represents the label of the active window; k represents the label of the corresponding spreading code of the active window; e is the received signal; n is the label of the symbol; and $c^{(k)}$ represents the $k^{th}$ spreading code as shown in equation (6).

In Steps 36, 37, 381 and 382, calculate the power of each matched data, and compare these power values with the second reference value, respectively; if the power is no more than the second reference value, the code channel that corresponds to the power is non-active; if the power is greater than the second reference value, the code channel that corresponds to the power is active. If there are several active code channels that have used the same spreading code, only the active code channel that has maximum power of matched data is selected.

$$P_2^{(k_m,k)} = \sum_{n=1}^{22} |\hat{d}_n^{(k_m,k)}|^2, \; f_1(k_m) = 1 \qquad (7)$$

$$f_1(k_m, k) = \begin{cases} 1, & P_2^{(k_m,k)} > T_2 \\ 0, & P_2^{(k_m,k)} \leq T_2 \end{cases}, \; f_1(k_m) = 1 \qquad (8)$$

$$\left.\begin{array}{l} f_2(i,k) = 1 \\ \vdots \\ f_2(j,k) = 1 \end{array}\right\} \Rightarrow \max\left(\left(P_2^{(i,k)} \ldots P_2^{(j,k)}\right)\right) \to k, k_m \qquad (9)$$

In equation (7), $P_2^{(k_m,k)}$ represents the matched data power of the $k^{th}$ code channel that corresponds to the $k_m^{th}$ active window. In equation (8), $T_2$ represents the second reference value, $f_2(\bullet)$ represents the active status function; if $f_2(k_m,k)=0$, it represents that the $k^{th}$ code channel, corresponding to the $k_m^{th}$ active window, is a non-active code channels; if the $f_2(k_m,k)=1$, it represents that the $k^{th}$ code channel, corresponding to the $k_m^{th}$ active window, is an active code channel. Equation (9) shows that if a spreading code corresponds to multiple active code channels, then only the code channel with maximum matched power is selected.

In Step 39, adjust channel responses of each active window according to the corresponding number of active code channels. Suppose the $k_m^{th}$ active window corresponds to $K^{(k_m)}$ active code channels, then the channel response of the $k_m^{th}$ active window is:

$$\underline{h}^{(k_m)} = \frac{\left(\underline{h}_1^{(k_m)} \underline{h}_2^{(k_m)} \ldots \underline{h}_w^{(k_m)} \ldots \underline{h}_W^{(k_m)}\right)}{\sqrt{K^{(k_m)}}}, \; f_1(k_m) = 1 \qquad (10)$$

In Step 310, make multi-user detection using the active code channels that are obtained by steps 30 to 39.

The invention discloses a method for detecting active code channels to guarantee the implementation of multi-user detection at a terminal. The method takes the data sequences and channel estimation results at the terminal as the inputs; first the active status of each channel response window is obtained based on the channel responses, and then all possible allocated spreading codes of each active window are listed, finally make matched filtering by using the channel responses of the active windows and the spreading codes, make power calculation based on the matched data, and obtain the active code channels of each active window based on the calculated power. When only the allocation information of the expected user is given, this solution to detection of active code channel outputs all the active code channels that are necessary for the multi-user detection; other code channels that the base station have not allocated, or have allocated but have not transmitted, or have transmitted but have been severely attenuated by beam forming or seriously faded by wireless channels, are all discarded to guarantee the implementation and performance of the multi-user detection at the mobile terminal.

The method of this invention is suitable for any CDMA system that takes channel responses and spreading codes as the characteristic parameters, and ensures the implementation of blind or semi-blind multi-user detection at the mobile terminal or base station.

It can be seen from the above embodiment that the solution for detection of active code channels in accordance with this invention includes three basic steps:

1) Determine whether a channel response window is active or not;
2) List allocated spreading codes for each active code channel response window;
3) Determine whether the allocated spreading codes are active or not for each active channel response window.

Said determining whether a channel response window is active or not may also be implemented in the way as follows: compare the signal power of channel response window of each interfering user with the first reference value; if the signal power of the channel response window is greater than the first reference value, it is considered that the window is active and needs to take part in the multi-user detection; otherwise the window is non-active and there is no need to take part in the multi-user detection. The signal power of a channel response window can be the power of a tap, such as the peak power, or the weighted sum of several tap powers of a window, such as the mean power. The first reference value can be one-level or multi-level reference values, such as reference value 11 and reference value 12, and can be expressed as a multiple of the expected window power or a multiple of the noise power.

The allocated spreading codes for an active code channel response window to be listed can be fixed spreading codes that have corresponding relationship with the response window, or a series of spreading codes obtained in the 'exhaustive' way. The 'exhaustive' procedure can be made in parallel, i.e. exhausting the corresponding allocated spreading codes to each window at the same time; or in serial, i.e. the latter window correspondingly takes the spreading codes except those that have been obtained by the former window.

In practical implementation, the steps 35 to 381 can be performed in an alternative simplified way, for example, number every active interference window from left to right respectively, combine the first active interference window with all spreading codes with SF=16 except the spreading code of the expected user, make matched filtering, and then use the matched data power f to obtain the active code channels for the first window; combine the second active interference window with all spreading codes of SF=16 except the spreading code of the expected user and the spreading codes of the first active interference window, make matched filtering, and then use the matched data power for determination to obtain the active code channels for the second window; and so on until the active code channels of all active interference windows have been obtained.

Determining the activation of the allocated spreading code for an active window is performed as follows: make whitened and matched filtering by using the allocated spreading codes and the active window channel response; calculate the matched data powers, and compare the powers with the second reference value; if a channel power is greater than the second reference value, then it is considered that the channel is active and needs to take part in the multi-user detection; otherwise the channel is non-active and does not need to take part in the multi-user detection. In the above comparison procedure, an alternative way is to determine, first, the matched data power of the expected user, and then determine the matched data power of the interfering users. And the two comparisons may take different second reference values. For the expected user it is desirable that the probability of missing detection, i.e. the probability of a channel that has transmission from the base station but is detected as non-active, is as low as possible. For the interfering user it is hoped that the probability of false alarm detection, i.e. the probability of a channel that has no transmission from the base station but is detected as active, is as low as possible. The second reference value can be of one level or multiple levels, such as reference value 21 and reference value 22, and can be expressed as the multiple of the power of a code channel that must be selected or the multiple of noise power. For the expected user, the code channel that must be selected is the known expected channel; and for the interference users, the code channel that must be selected is either a known expected channel, or a known transmission channel of the window, or the channel corresponding to the maximum power of the window.

Figure 4:
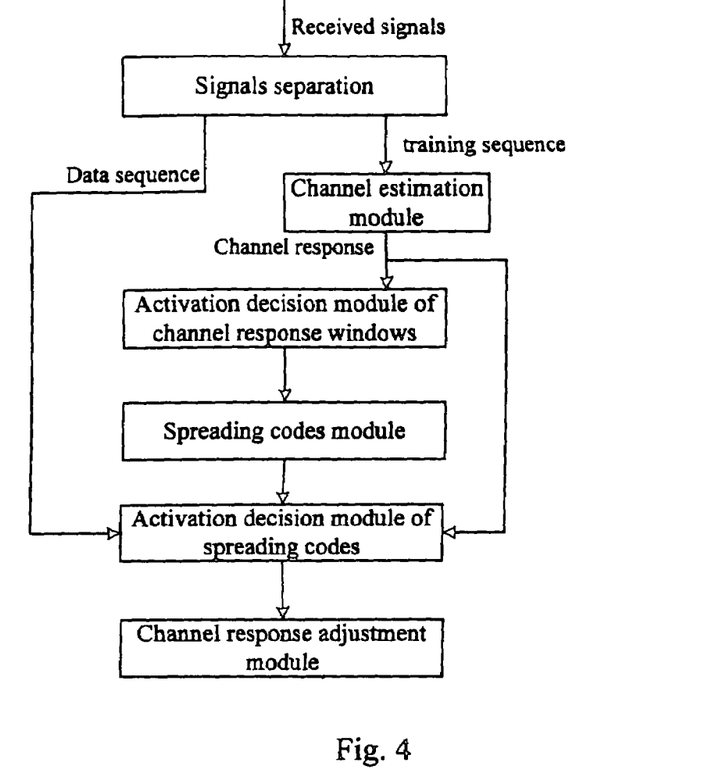
FIG. 4 is a schematic diagram of the apparatus for detecting active code channels in accordance with this invention.
Figure 5:
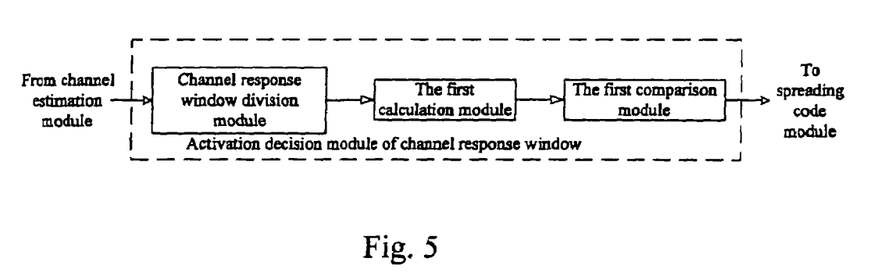
FIG. 5 is a schematic diagram of the activation decision module of channel response window in the apparatus for detecting active code channels.
Figure 6:
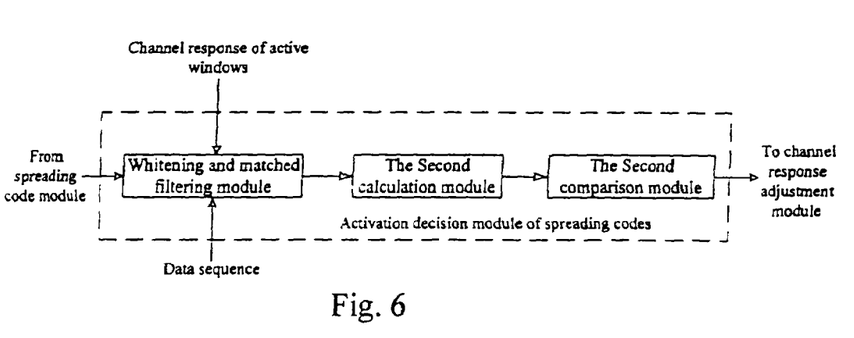
FIG. 6 is a schematic diagram of the activation decision module of spreading codes in the apparatus for detecting active code channels.

In accordance with the embodiment of this invention, an apparatus that detects active code channels is also provided, as shown in FIG. 4, where the activation decision module of channel response window is shown in FIG. 5, and the activation decision module of the spreading code is shown in FIG. 6. The function and the signal processing in these modules are the same as those of the said method.

As shown in FIG. 4, the apparatus for detecting active code channels includes: a signal separating module that separates data sequences and training sequences from the received signal that includes the radio signals of at least two users; a channel estimation module that uses the training sequences output from the signal separating module to do channel estimation in order to obtain joint channel responses; an activation decision module of the channel response window that uses the joint channel response output from the channel estimation module to obtain the active code channel response window; a spreading code module that uses the active code channel response window output from the activation decision module of the channel response window to obtain possible corresponding allocated spreading codes; an activation decision module of spreading code that uses the channel response of the active code channel response window, the separated data sequences output from the signal separation module and the possible corresponding allocated spreading codes to obtain and output the active spreading code channels that are corresponding to the active channel response window.

As shown in FIG. 5, the activation decision module of channel response window in FIG. 4 includes: a channel response window division module, the first calculation module and the first comparison module. The channel response window division module divides the joint channel response output from the channel estimation module into channel response windows according to the window length. The first calculation module computes the signal power of each channel response window output from the channel response window division module. The first comparison module compares the signal power of each channel response window, output from said the first calculation module, with the first predefined threshold, respectively, and outputs the channel response windows with a signal power greater than the first predefined threshold as the active channel response windows to the spreading code module.

As shown in FIG. 6, the activation decision module of spreading code in FIG. 4 includes: a whitening and matched filtering module, the second calculation module and the second comparison module. The whitening and matched filtering module carries out whitening and matched filtering of the possible allocated spreading codes corresponding to the active channel response windows that are outputted from the spreading code module, the separated data sequences output from the signal separation module and the channel responses of the active channel response windows. The second calculation module computes the matched data power of each spreading code that corresponds to each active channel response window output from the whitening and matched filtering module. The second comparison module compares each matched data power output from the second calculation module with the second predefined threshold, respectively, and outputs the code channels with a power greater than the second predefined threshold as the active code channels. A channel response adjustment module adjusts the channel response of the active windows based on the number of active code channels of each active channel response window outputted from the second comparison module.

The invention claimed is:

1. A method for detecting active code channels of multiple users in a wireless communication system, the method comprising the following steps:
   Receiving radio signals of at least two of said multiple users by a receiver; Separating data sequences and training of said received radio signals by the receiver;
   Making joint channel estimation based on said separated training sequences to obtain joint channel responses by the receiver;
   Obtaining, based on said joint channel responses, active channel response windows by the receiver;
   Obtaining allocated spreading codes to which said active channel response windows may correspond by the receiver; and
   Obtaining active spreading code channels to which said active channel response windows correspond based on the channel responses of said active channel response windows by the receiver, the allocated spreading codes to which said active channel response windows may correspond and the separated data sequences.

2. The method according to claim 1, wherein the step of obtaining the active channel response windows by the receiver comprises:
   Dividing joint channel response into channel response windows according to a window length; and
   Determining whether the signal power of each channel response window is greater than a first predefined threshold, if yes, deciding that the channel response window is active.

3. The method according to claim 1, wherein the step of obtaining the allocated spreading codes to which said active channel response windows may correspond by the receiver comprises: listing exhaustively all allocated spreading codes to which every active channel response window may correspond.

4. The method according to claim 1, wherein the step of obtaining the active spreading code channels to which said active channel response windows may correspond by the receiver comprises: carrying out whitening and matched filtering for each active channel response window by using the channel response thereof, all the allocated spreading codes to which the window may correspond, and the separated data sequences, obtaining the matched data of each spreading code to which said active channel response windows correspond; calculating the power of each matched data; and deciding whether said calculated power is greater than a second predefined threshold, if yes, determining that the spreading code channel to which said calculated power corresponds is an active code channel.

5. The method according to claim 2, wherein the signal power of said channel response window is a tap power of said channel response window, or the weighted sum of several tap powers of said channel response window; and said predefined threshold is a multiple of the power of the channel response window of an expected user or a multiple of the noise power.

6. The method according to claim 1, wherein said step of obtaining the active channel response windows by the receiver comprises:
   Dividing joint channel response into channel response windows according to the window length; and
   Determining whether the signal power of each interfering user window is greater than the first predefined threshold, if yes, determining that the said interfering user window is an active channel response window of interfering user.

7. The method according to claim 6, wherein said step of obtaining the active spreading code channels to which said active channel response windows correspond by the receiver comprises:
   Numbering each active channel response window of interfering user from left to right;
   Combining the first active channel response window of interfering user with all the spreading codes, respectively, except the spreading code of the expected user, for whitening and matched filtering, then making decision based on the matched data power, and obtaining the active code channels corresponding to said window;
   Combining the second active channel response window of interfering user with all the spreading codes, respectively, except the spreading code of the expected user and the active spreading code of the first active channel response window of interfering user, for whitening and matched filtering, then making decision based on the matched data power, and obtaining the active code channels corresponding to said window;
   And so on and so forth, until the active code channels of all active channel response windows of interfering user are obtained.

8. The method according to claim 7, wherein said step of making decision based on the matched data power and obtaining the active code channels to which the active channel response windows of interfering user correspond by the receiver comprises: first, determining whether the matched data power of the expected user is greater than a reference value of said expected user, if yes, deciding that the spreading code channel corresponding to said power is an active code channel; and then determining whether said matched data power of each interfering user is greater than a reference value of interfering user, if yes, the spreading code channel corresponding to said power is an active code channel.

9. The method according to claim 8, wherein said reference value of the expected user satisfies minimum probability of missing detection; and said reference value of interfering user satisfies minimum probability of false alarm detection.

10. The method according to claim 8, wherein said reference value of expected user is a multiple of the power of the code channel that must be selected or a multiple of the noise power, wherein the code channel of the expected user that must be selected is a predefined and known expected code channel; and
   said reference value of interfering user is a multiple of the power of the code channel that must be selected or a multiple of the noise power, wherein said code channel of interfering user that must be selected is a known expected channel, or a known transmission channel for said window of interfering user, or a code channel corresponding to the maximum power of said window of interfering user.

11. The method according to claim 1, further comprising the step of adjusting the channel responses of the active windows based on the number of active code channels of each active channel response window by the receiver.

12. An apparatus for detecting active code channels of multiple users in a wireless communication system, comprising:

A signal separating module for use in separating data sequences and training sequences of a received signal from a receiver that contains radio signals of at least two users;

A channel estimation module for use in making channel estimation and obtaining joint channel responses based on the training sequences outputted from said signal separating module;

An activation decision module of channel response window for use in obtaining active channel response windows based on the joint channel responses outputted from said channel estimation module;

A spreading code module for use in obtaining allocated spreading codes to which the active channel response windows may correspond according to the active channel response windows outputted from said activation decision module of channel response window; and An activation decision module of spreading code for use in obtaining and outputting active spreading code channels to which the active channel response windows correspond based on the channel responses of the active channel response windows, the separated data sequences outputted from the signal separating module and the possible corresponding allocated spreading codes outputted from said spreading code module.

13. The apparatus according to claim 12, wherein said activation decision module of channel response window comprises as well: a channel response window division module, a first calculation module and a first comparison module, wherein Said channel response window division module divides the joint channel response outputted from said channel estimation module into channel response windows according to a window length;

Said first calculation module calculates the signal power of each channel response window outputted from said channel response window division module; and Said first comparison module compares the signal power of each channel response window outputted from said first calculation module with a first predefined threshold, respectively, and outputs the channel response windows with the signal power greater than the first predefined threshold as active channel response windows to the spreading code module.

14. The apparatus according to claim 12, wherein said activation decision module of spreading code comprises a whitening and matched filtering module, a second calculation module and a second comparison module, wherein Said whitening and matched filtering module carries out whitening and matched filtering of the allocated spreading codes which are outputted from said spreading code module and to which the active channel response windows may correspond, the separated data sequences outputted from said signal separating module and the channel responses of the active channel response windows;

Said second calculation module calculates the matched data power of every spreading code that corresponds to each active channel response window outputted from said whitening and matched filtering module; and Said second comparison module compares each matched data power outputted from the second calculation module with a second predefined threshold, respectively, and outputs the code channels with the power greater than the second predefined threshold as the active code channels.

15. The apparatus according to claim 12, further comprising a channel response adjustment module for use in adjusting the channel responses of active windows based on the number of active code channels of each active channel response window outputted from said activation decision module of spreading code.

* * * * *